May 19, 1942.  T. L. FAWICK  2,283,325
CENTRIFUGAL CLUTCH
Filed Sept. 13, 1938  3 Sheets-Sheet 1

INVENTOR
Thomas L. Fawick
BY
Willard D. Eakin
ATTORNEY

May 19, 1942.   T. L. FAWICK   2,283,325
CENTRIFUGAL CLUTCH
Filed Sept. 13, 1938   3 Sheets-Sheet 2
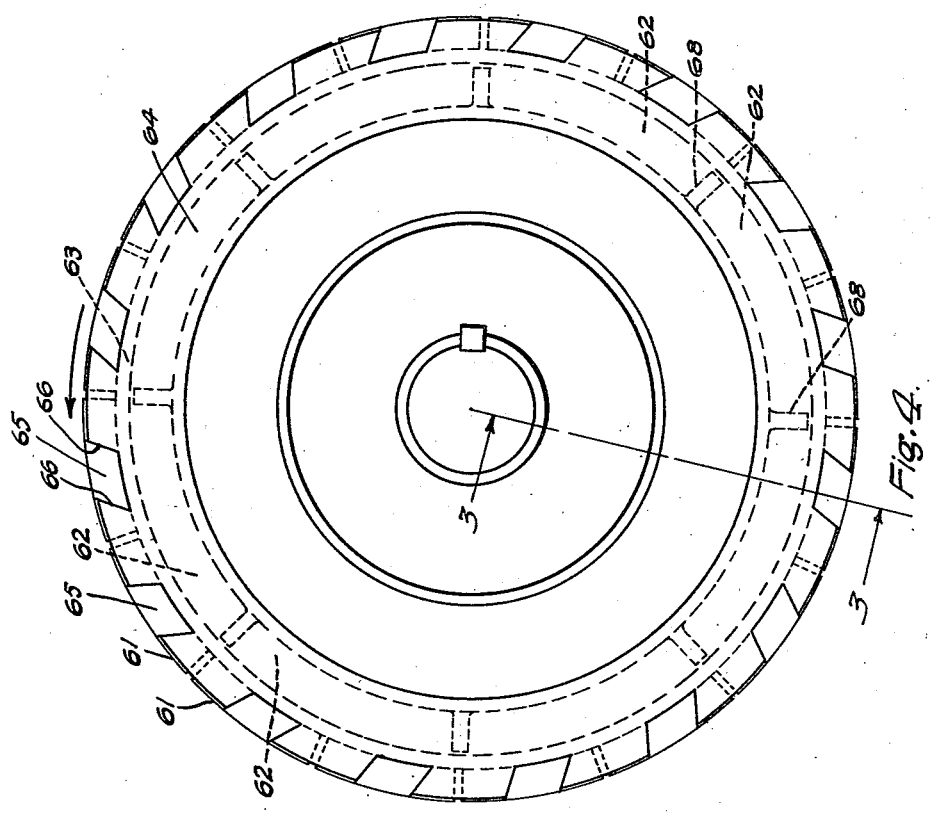
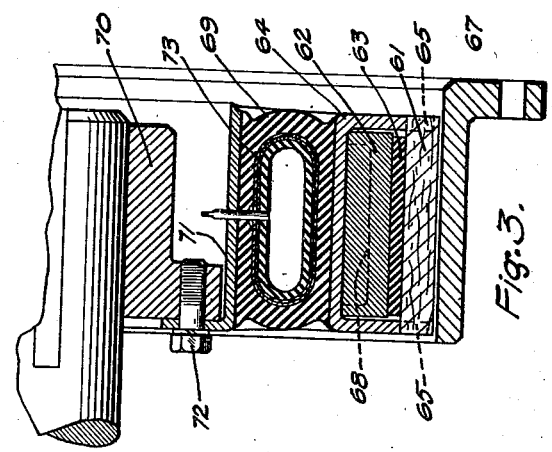
INVENTOR
Thomas L. Fawick
BY
Willard D. Eakin
ATTORNEY May 19, 1942. T. L. FAWICK 2,283,325
CENTRIFUGAL CLUTCH
Filed Sept. 13, 1938 3 Sheets-Sheet 3
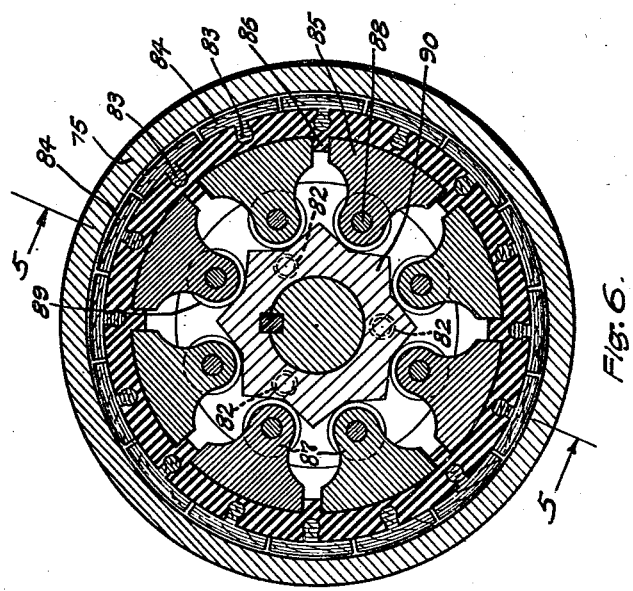
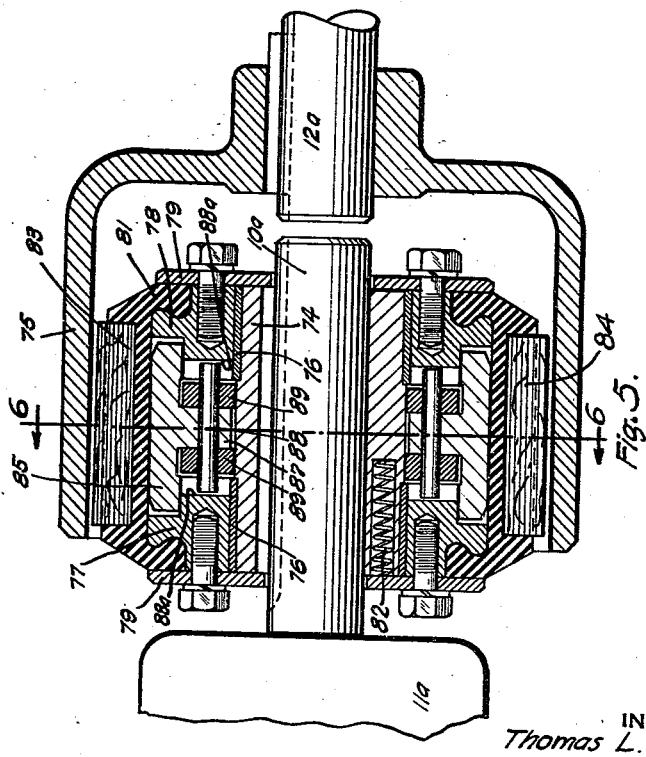
INVENTOR
Thomas L. Fawick
BY
Willard D. Eakin
ATTORNEY Patented May 19, 1942

2,283,325

UNITED STATES PATENT OFFICE 2,283,325

CENTRIFUGAL CLUTCH

Thomas L. Fawick, Akron, Ohio, assignor to The Fawick General Company, Inc., a corporation of Indiana Application September 13, 1938, Serial No. 229,683

14 Claims. (Cl. 192—105)

This invention relates to centrifugal clutches and its chief objects are to provide a centrifugal clutch assembly adapted for cushioning the torque; to provide a centrifugal clutch assembly having characteristics of a flexible coupling; to provide a centrifugal clutch assembly having both the torque-cushioning and the flexible coupling features; to provide a self-energizing centrifugal clutch; and to provide simplicity and economy of construction and effective and dependable operation.

Of the accompanying drawings:

Fig. 3 is a side elevation, with the lower portion in section on line 3—3 of Fig. 4, of another modification.

Fig. 4 is an end elevation, from the right of Fig. 3, of the driving assembly of Fig. 3.

Fig. 5 is an axial section, on line 5—5 of Fig. 6, of still another modification.

Fig. 6 is a section on line 6—6 of Fig. 5.

Figure 2:
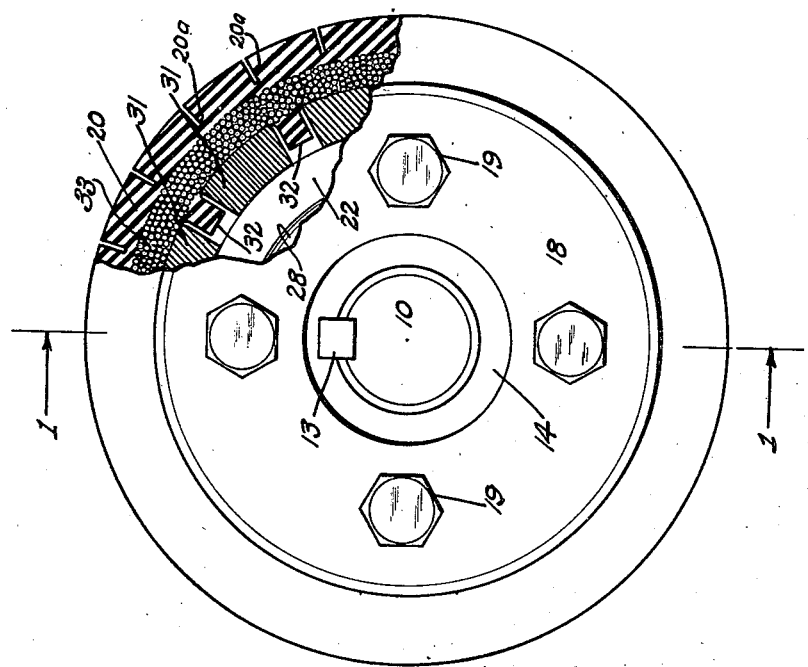
Fig. 2 is an end elevation, from the right of Fig. 1, of the driving part of the assembly.
Figure 1:
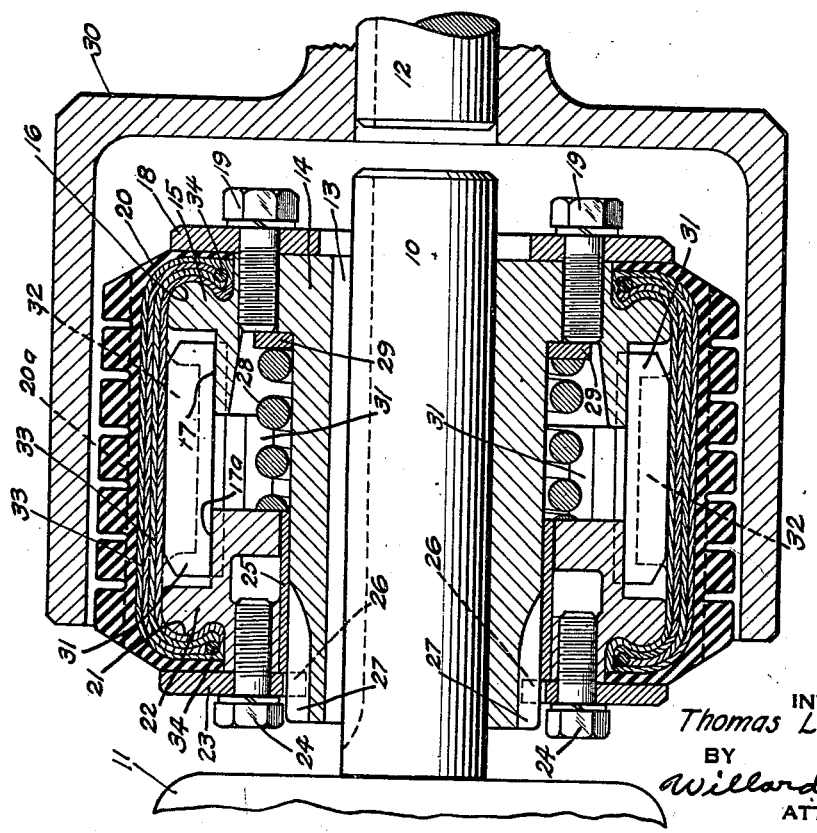
Fig. 1 is an axial section, on line 1—1 of Fig. 2, of one of the preferred embodiments of my invention.

Referring to the drawings, and first to Figs. 1 and 2, the assembly there shown comprises the shaft 10 of a motor 11 and a driven shaft 12.

Secured upon the driving or motor shaft 10 by a key 13 is a hub member 14 formed at its right-hand end with an annular flange 15 formed with a laterally rounded clamping face 16 and with a cylindrical outer face or shoulder 17. Clamped between the said clamping face 16 and an annular clamping ring 18, under the force of cap-screws 19, 19, is one of the bead portions of a tire-like member 20, of which the other bead portion is clamped between a laterally rounded clamping face 21, of a ring member 22, and a clamping ring 23, under the force of cap-screws 24, 24.

The ring member 22 is provided internally with a bronze bushing 25 and is mounted for axial sliding movement upon the hub member 14. To prevent it from rotating with relation to the hub member, the clamping ring 23 is formed with a plurality of lugs or keys 26, 26 extending inwardly into guide-way recesses or key-ways 27, 27 formed in the hub member 14.

Urging the ring member 22 and its assembly away from the flange 15 of the hub member 14, to keep the tire-like member 20 under transverse tension, is a helical compression spring 28 interposed between the ring member 22 and a flat ring 29 which is mounted on a small-diameter portion of the hub member 14 and abuts the inner ends of the cap-screws 19, or, when the cap-screws are removed, a stop-shoulder formed on the hub member. Cap-screws of different lengths can be used for changing the force of the spring.

Secured upon the driven shaft 12 is a bell-shaped driven member 30 and for supplementing the centrifugal force of the middle portion of the tire-like member to urge it outwardly into driving engagement with the bell member 30, a circumferential series of arcuate weights 31, 31 are mounted between the tire-like member and spaced-apart cylindrical outer faces 17, 17a formed on the ring member 22 and on the hub member 14.

To compel the weights to rotate in orderly relation with the other parts of the driving assembly, the tire-like member preferably is formed with internal rubber lugs 32, 32 projecting inwardly between adjacent weights.

The tire-like member 20, preferably composed chiefly of rubber or the like, may be reinforced with cords such as the cords 33, 33. When cords are employed they preferably are so built into the tire-like member as to extend directly crosswise of it, or nearly so, for the sake of greater flexibility of the assembly, for flexible-coupling purposes, than is afforded by bias or obliquely-disposed cords.

The tire-like member may be provided with bead-cores such as the bead cores 34, 34, and the cores can be extensible, if desired, for greater ease in mounting the tire-like member on the hub member 14 and the ring member 22.

The outer tread surface of the tire-like member 20 preferably is formed with transverse grooves 20a to increase its longitudinal stretchability, and in other respects it can be formed with such non-skid design as may be desired.

In other respects, as will be clear upon consideration of the point, the several parts are adapted for facility of assembly.

In the operation of this assembly of Figs. 1 and 2, rotation of the motor shaft and the inner or driving assembly mounted thereon causes the middle portion of the tire-like member to move outward, under its own centrifugal force and that of the weights 31, against the force of the spring 28, and thus to come into frictional driving engagement with the inner face of the driven bell-like member 30, the driving engagement being of increased force as the speed of the motor increases.

When the motor is shut off and its speed consequently decreases, so that the centrifugal force is less, the spring 28, forcing the ring member 22 away from the flange 15 of the hub member 14, effects prompt disengagement of the tire-like member 20 from the bell member 30.

In the embodiment shown in Figs. 3 and 4, a series of friction blocks 61, 61 and a series of weights 62, 62 and an intervening endless rubber band 63 are mounted in the channel of a transversely U-shaped metal member 64, the friction blocks preferably being vulcanized to the rubber band, and the friction blocks are formed at their ends with tongues 65, 65 slidably fitting in respective notches formed in the peripheries of the side flanges of the U-shaped metal member 64. Preferably the walls of the notches and the abutting faces of the tongues 65, as at 66, 66, are inclined in such relation to the axis of the assembly and with respect to the direction of rotation, that when the friction blocks contact with the driven member (shown at 67 in Fig. 3) the resistance of the latter will produce a self-energizing effect, which increases as the torque increases, the rear walls of the recesses urging the blocks outward by reason of their oblique relation, with a cam action.

For compelling the weights 62 to be driven in orderly relation lugs 68, 68 are welded to the floor of the channel member 64 and extend between adjacent weights.

Because of the positive interlock of the tongues 65 of the friction blocks with the flanges of the channel member, it is desirable to provide for a flexible-coupling and a torque-cushioning effect by interposing an annular pneumatic cushioning member 69 between the channel member 64 and the hub, 70. Preferably this is done by vulcanizing the pneumatic member 69 to the channel member and to an annular metal stamping 71 of L shape in cross-section and securing the latter to the hub member by means of cap-screws such as the cap-screw 72.

The pneumatic member preferably is of rubber or the like and can be reinforced with cords such as the cords 73, which preferably extend directly cross-wise of the member 69 for lightness of construction for a given air pressure, for high flexibility of the assembly as a flexible coupling, and for highly effective cushioning of the torque.

The mode of operation of this embodiment will be clear from the foregoing description.

One of its advantages is that the self-energizing effect can be had in either direction of drive by merely reversing the driving assembly on the shaft.

In the embodiment shown in Figs. 5 and 6 a drive shaft 10ª and a driven shaft 12ª have secured thereon respectively a hub member 74 and a bell-shaped driven member 75. The hub member 74 is provided with bronze bushings 76, 76 on which are slidably mounted respective annular clamping members 77, 78 which coact with clamping rings 79, 79 and cap-screws 80, 80 for clamping the bead portions of a tire-like member 81.

Mounted in recesses formed in the hub member 74 are a plurality of compression springs 82, 82 which bear against the adjacent annular clamping ring 79 to keep the tire-like member 81 under transverse tension.

The tire-like member 81 is formed in its tread surface with recesses for the reception, with a snap fit, of headed stems 83, 83 formed on the inner sides of respective friction blocks 84, 84 which seat upon the tread face of the tire-like member, are held in place by the headed stems, and are adapted to be forced outward against the inner face of the bell-like member 75 for clutch engagement.

As the principal factor for effecting the outward movement of the tread portion of the tire-like member a circumferential series of centrifugal weights 85, 85 are mounted within the tire-like member and between weight-driving lugs 86, 86 formed on its inner face.

For augmenting the outward force exerted upon the tread portion of the tire-like member 81, especially after the friction blocks 84 have come into contact with the inner face of the bell like member 75, each of the weights 85 is formed with a longitudinally disposed inwardly extending stem 87 having journaled therein an axle 88 on each end portion of which is mounted a roller 89, the pin extending into guide slots 88ª, 88ª.

These rollers are mounted in the valleys or notches of a star-shaped cam wheel 90 and bear against the same under the yielding force of the transverse and longitudinal tension of the tire-like member 81, the wheel 90 permissibly being formed as the integral middle part of the hub member 74.

By reason of the inertia of the assembly including the weights, the tire-like member and its clamping assemblies, the star-shaped cam wheel 90 exerts some outward force upon the centrifugal weights in the early part of their outward movement, but the chief function of the cam wheel in this embodiments is to increase the outward force of the friction blocks after they have contacted the inner face of the bell shaped driven member 75, thus providing a self-energizing effect for the clutch by reason of the torque being sustained substantially in its entirety by the oblique cam faces of the star-shaped cam wheel.

The friction blocks and the weights have stability by reason of their extended areas of contact with the outer and inner cylindrical surfaces of the tread portion of the tire-like member, in relation to the short length of the weights' stems 87, so that an even frictional engagement of the clutch is provided, and the cushioning effect of the resilient tread portion of the tire-like member contributes to this effect and also, in conjunction with the resiliently deformable side wall portions of the tire like member, provides a desirable flexible coupling effect for the clutch assembly and also a torque-cushioning effect.

An advantage of the embodiment shown in Figs. 5 and 6 is that the same action is obtained in either direction of drive.

Further modifications are of course possible within the scope of the appended claims.

In all of the embodiments illustrated the part of the elastic annular member which stretches longitudinally, in radial outward movement, for clutch engagement, is symmetrically anchored to the rest of the inner, driving assembly, and throughout the circle thereof, for transverse symmetry and lengthwise uniformity of engagement pressure; the weight members are transversely and longitudinally rigid for uniformity of engagement pressure; and the said portion of the annular member is flexible and stretchable in both directions so that it can accommodate itself to the determinate space between the rigid, outer, driven member and the series of rigid weights within it, for uniformity of engagement pressure.

Also it is of less radial thickness than width and both of its side margins, by which alone, if at all, it is anchored, are unconfined throughout such substantial widths that the clutch-engaging and disengaging deformation can occur without substantial chafing of the member against a confining member and without excessively localized flexing or stretching. In this sense it will be referred to as "floating" in the appended claims.

I claim:

1. A centrifugal clutch comprising an outer driven member and an inner driving assembly, the latter comprising a circumferentially disposed strip of stretchable material, a series of centrifugal weights for stretching it outward to effect driving engagement with the driven member, the said strip being adapted, by reason of elastic recoil, to urge the weights toward their de-clutch positions and elastic means additional to the stretchable strip for urging it to assume its de-clutch position.

2. A centrifugal clutch comprising an outer driven member and an inner driving assembly, the latter comprising a driving shaft, a hub member thereon, a clamping assembly mounted on the hub member, a clamping assembly slidably mounted on the hub member, means urging the slidable clamping assembly away from the other clamping assembly, and a circumferentially disposed strip of stretchable material of inwardly open channel form having its margins clamped by the clamping means respectively.

3. A centrifugal clutch comprising an outer driven member and an inner driving assembly, the latter comprising a driving shaft, a hub member thereon, a clamping assembly mounted on the hub member, a clamping assembly slidably mounted on the hub member, means urging the slidable clamping assembly away from the other clamping assembly, a circumferentially disposed strip of stretchable material of inwardly open channel form having its margins clamped by the clamping means respectively, and a series of centrifugal weights within the stretchable strip.

4. A centrifugal clutch comprising an outer driven member and an inner driving assembly, the latter comprising a driving shaft, a hub member thereon, two clamping assemblies upon the hub member, at least one of them being slidably mounted thereon, means urging one of the clamping assemblies away from the other, and a circumferentially disposed strip of stretchable material of inwardly open channel form having its margins clamped by the clamping means respectively.

5. A centrifugal clutch comprising an outer driven member and an inner driving assembly, the latter comprising a driving shaft, a hub member thereon, two clamping assemblies upon the hub member, at least one of them being slidably mounted thereon, means urging one of the clamping assemblies away from the other, a circumferentially disposed strip of stretchable material of inwardly open channel form having its margins clamped by the clamping means respectively, and a series of centrifugal weights within the stretchable strip.

6. In apparatus of the character described the combination of two relatively rotary structures, one of the same having a frictional surface for engagement with the other, cam means for at least enhancing the pressure of the frictional engagement and thus providing a self-energizing effect, and cushioning means, resiliently deformable in all directions, interposed operatively between the cam means and said surface.

7. In apparatus of the character described the combination of two relatively rotary structures, one of the same having a frictional surface for engagement with the other, and cam means for at least enhancing the pressure of the frictional engagement and thus providing a self-energizing effect, the cam means comprising a circumferential series of cams facing toward and in directions approximately normal to the friction surface, a series of cam rollers engaging the same respectively, axle members for the cam rollers, and frictional engagement means actuated through said axles.

8. In apparatus of the character described, the combination of two relatively rotary structures adapted for frictional engagement with each other, one of the same comprising a circumferentially disposed strip of resiliently deformable material so constructed and arranged as to provide torque-cushioning and flexible-coupling effects, and cam means for at least enhancing the pressure of the driving engagement.

9. A clutch comprising an outer driven member and an inner driving assembly, the latter comprising a circumferentially disposed strip of stretchable material, a series of friction blocks on the outer face thereof and anchored thereto, centrifugal means for stretching it outward to effect driving engagement with the driven member, and cam means for enhancing the pressure of the driving engagement.

10. In apparatus of the character described the combination of two relatively rotary structures adapted for frictional engagement with each other, one of the same comprising a circumferentially disposed strip of resiliently deformable material and a series of friction blocks on the outer face thereof and having snap-fit anchorage therein.

11. In apparatus of the character described the combination of two relatively rotary structures adapted for frictional engagement with each other, one of the same comprising a circumferentially disposed strip of resiliently deformable material and a series of friction blocks on the outer face thereof, each block being formed with a headed stem embedded in the material of the strip.

12. In apparatus of the character described, the combination of two relatively rotary structures adapted for frictional engagement with each other, one of the same comprising a circumferentially disposed strip of resiliently deformable material so constructed and arranged as to provide torque-cushioning and flexible-coupling effects and cam means for at least enhancing the pressure of the driving engagement, the cam means comprising a circumferential series of pivoted rigid members engaging said strip at portions sufficiently spaced apart circumferentially in relation to their radial depth to their pivots as to cause the strip to give them stability against being rocked on their pivots by the torque.

13. In apparatus of the character described, the combination of two relatively rotary structures adapted for frictional engagement with each other, one of the same comprising a circumferentially disposed strip of resiliently deformable material so constructed and arranged as to provide torque-cushioning and flexible-coupling effects and cam means for at least enhancing the pressure of the driving engagement, the cam means comprising a circumferential series of pivoted rigid members engaging said strip and means for radially guiding the pivots of said rigid members.

14. In apparatus of the character described, the combination of two relatively rotary structures adapted for frictional engagement with each other, one of the same comprising a circumferential series of rigid members pivoted on axially disposed, radially movable axes, means for radially guiding said axes, and means for moving said members radially outward for effecting the frictional engagement, each of said members having engagement with an outer member at positions sufficiently spaced apart circumferentially of the assembly to give them stability against being rocked on their pivots by the torque.

THOMAS L. FAWICK.